US012747959B2

(12) United States Patent
Biggs

(10) Patent No.: US 12,747,959 B2
(45) **Date of Patent: *Sep. 29, 2026**

(54) SYSTEMS AND METHODS FOR INTERACTIVE DIGITAL MAPS

(71) Applicant: Brandon Biggs, Gilroy, CA (US)

(72) Inventor: Brandon Biggs, Gilroy, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 18/775,826

(22) Filed: Jul. 17, 2024

(65) Prior Publication Data

US 2024/0369372 A1 Nov. 7, 2024

Related U.S. Application Data

(63) Continuation of application No. 17/304,508, filed on Jun. 22, 2021, now Pat. No. 12,135,221.

(60) Provisional application No. 63/052,645, filed on Jul. 16, 2020, provisional application No. 63/043,088, filed on Jun. 23, 2020.

(51) Int. Cl.

| | |
|---|---|
| ***G01C 21/00*** | (2006.01) |
| ***G01C 21/36*** | (2006.01) |
| ***G06F 3/16*** | (2006.01) |
| ***G09B 21/00*** | (2006.01) |

(52) U.S. Cl.

CPC ..... *G01C 21/3807* (2020.08); *G01C 21/3629* (2013.01); *G06F 3/167* (2013.01); *G09B 21/006* (2013.01)

(58) Field of Classification Search

CPC ............ G01C 21/3807; G01C 21/3629; G01C 21/206; G06F 3/167; G09B 21/006; G09B 29/102

See application file for complete search history.

(56) References Cited

U.S. PATENT DOCUMENTS

| | | | | |
|---|---|---|---|---|
| 5,461,399 | A | 10/1995 | Cragun | |
| 6,961,458 | B2 | 11/2005 | Dutta et al. | |
| 7,765,496 | B2 | 7/2010 | Bernstein | |
| 8,271,888 | B2 | 9/2012 | Carter et al. | |
| 8,346,751 | B1 * | 1/2013 | Jin | G06F 16/29 707/708 |
| 9,182,243 | B2 | 11/2015 | Van Os et al. | |
| 10,534,082 | B2 | 1/2020 | Clark et al. | |

(Continued)

OTHER PUBLICATIONS

Brandon Biggs, Lena Yusim, Peter Coppin, "The Audio Game Laboratory: Building Maps from Games", The 24th International Conference on Auditory Display (ICAD 2018).

(Continued)

*Primary Examiner* — Anne Marie Antonucci
*Assistant Examiner* — Wesam NMN Almadhrhi
(74) *Attorney, Agent, or Firm* — NetLawyers LLP

(57) ABSTRACT

Methods and system for providing digital audio mapping are provided wherein data representing real or virtual worlds is obtained from internal or external data sources and used to generate a digital auditory map that can be navigated using auditory sound cues. The digital audio map can be created by a digital audio map generator and presented to the user through a digital audio map presentation interface. The digital audio map presentation interface can provide multiple navigation modes to the user, including a tree-based mode, a grid-based mode, and a first-person-based mode. The user is able to dynamically select the preferred navigation mode.

20 Claims, 11 Drawing Sheets

(56) References Cited

U.S. PATENT DOCUMENTS

| | | | |
|---|---|---|---|
| 10,997,828 | B2 | 5/2021 | Moura et al. |
| 2009/0285407 | A1 * | 11/2009 | Cragun .................. G06T 19/00 381/61 |
| 2010/0156892 | A1 | 6/2010 | Chan, II et al. |
| 2013/0042180 | A1 * | 2/2013 | Sai ...................... G09B 21/008 715/729 |
| 2013/0293344 | A1 | 11/2013 | Ur |
| 2013/0326425 | A1 * | 12/2013 | Forstall ............. G01C 21/3878 715/851 |
| 2016/0174031 | A1 | 6/2016 | Smith et al. |
| 2017/0293635 | A1 * | 10/2017 | Peterson ............ G06F 16/2477 |
| 2017/0318407 | A1 * | 11/2017 | Meister .................. H04S 7/303 |
| 2020/0329333 | A1 | 10/2020 | Norris et al. |

OTHER PUBLICATIONS

Brandon Biggs, James Coughlan, Peter Coppin, "Design and Evaluation of an Audio Game-Inspired Auditory Map Interface", The 25th International Conference on Auditory Display (ICAD 2019).

* cited by examiner

SYSTEMS AND METHODS FOR INTERACTIVE DIGITAL MAPS

CROSS-REFERENCE TO RELATED APPLICATIONS

The present invention is a continuation, and claims the benefit, of U.S. application Ser. No. 17/304,508, filed on 22 Jun. 2021, and which is currently pending, which in turn claims the benefit of U.S. Provisional Application No. 63/052,645, filed on 16 Jul. 2020, and U.S. Provisional Application No. 63/043,088, file on 23 Jun. 2020, all incorporated by reference herein and for which benefit of the priority date is hereby claimed.

FEDERALLY ENDORSED RESEARCH

Not applicable.

SEQUENCE LISTING OR PROGRAM

Code listing of a Javascript file is attached as Appendix 1.

FIELD OF INVENTION

The present invention relates to digital auditory maps. Specifically, the present invention relates to systems and methods for mapping real or virtual environments for navigation using auditory cues.

BACKGROUND OF THE INVENTION

Access to nonvisual maps has long required special equipment and training to people with visual impairments. Currently, the main method of nonvisual map representation is utilizing raised line tactile graphics, which are labeled using braille, or an interactive system, such as a touch screen being placed under a paper map. However, a tactile map is inconvenient and difficult to obtain, requiring a tactile embosser or other machine to create the graphic. There are currently devices that could potentially allow users to view a refreshable tactile graphic, but these devices are expensive and not commercially available. One method of nonvisual representation that is ubiquitous and available on almost all devices is audio. There has been some research about showing map information completely in audio, however, existing approaches only show one kind of data, such as Open Street Map data, do not have a way that allows users to easily recognize shapes, may not allow users to navigate the map on their preferred device, such as an iPhone, and only may show one of the below interface modes. Current auditory maps may be provided in one of the following modes: 1) first-person mode where sounds are positioned at objects around the listener and played using 3-Dimensional audio (in a loop), such that as a user changes their orientation and navigates through the map, the 3D sounds (e.g., the sound of a waterfall) change their auditory position relative to the user. As the user moves through the map, sounds (e.g., footstep sounds or spearcons) may be played based on the different data associated with the features present at the user's current position; 2) grid mode where a map is represented as a grid of tiles such that as a user moves into the tile, a spearcon and auditory icon may be played representing the changing features present in the tile; 3) tree mode where the map is represented in parent child relationships using a set of menus that are read out in speech. Existing audio maps are typically limited in the modes through which a user may navigate the map. For instance, many times, a user is locked into a first-person mode. Additionally, auditory elements that may provide environmental cues and added realism are often lacking from such maps.

Furthermore, existing maps may not provide users with options to select their preferred mode of usage. For example, the existing maps may use their own text to speech engines (TTS), rather than allowing users to use their own screen readers.

SUMMARY OF THE INVENTION

A need exists for inexpensive digital nonvisual mapping. A need also exists for a digital nonvisual mapping solution that can represent complex spatial information. A need exists for digital auditory maps that provide users with flexibility in navigating the environment to suit a user's preferences or goals. Additionally, a need exists for digital auditory maps that may provide auditory elements that may provide cues to a user that may aid in nonvisual navigation in a corresponding environment. Furthermore, a need exists for digital auditory maps that may allow a user to incorporate the user's own screen reader and provide text to speech capability. Furthermore, a need exists for auditory maps that can be applied to various platforms or use applications (e.g., accessible through a browser).

In this present disclosure, a method is provided for a digital auditory mapping interface. The method comprises: accepting data representative of spatial measurements of features within a real-world or data-based environment; and generating a map comprising one or more points, polygons, or lines, representative of one or more spatial features. The map comprises a plurality of navigational modes comprising: a tree-based mode comprising of a menu of features accessible in a hierarchical manner; grid mode comprising auditory feedback whenever a user enters a new grid tile, the speech feedback comprising at least the name of one or more of the features navigated to by the user, along with a sound representing one or more of the properties of the features under the user; and a first person mode configured to enable navigation and orientation changes in a selected direction at a specified rate, comprising one or more auditory cues of the navigation and surrounding objects. Using this system, a digital map representative of an environment may be provided with geometries representative of features within the environment. Other representational modes can include a heatmap where the features are represented by auditory queues derived from statistical properties. The Javascript function to accept the user's input to select the navigation mode is called: handleUserInput (event) as disclosed in the code listing in Appendix 1.

The digital auditory map may allow a user to access the map via a tree-based mode, grid mode, or first person mode. A user may be able to select their own speech preferences.

Another aspect of the present disclosure provides a non-transitory computer readable medium comprising machine executable code that, upon execution by one or more computer processors, implements any of the operations above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and descriptions are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein) of which:

DETAILED DESCRIPTION

Figure 1:
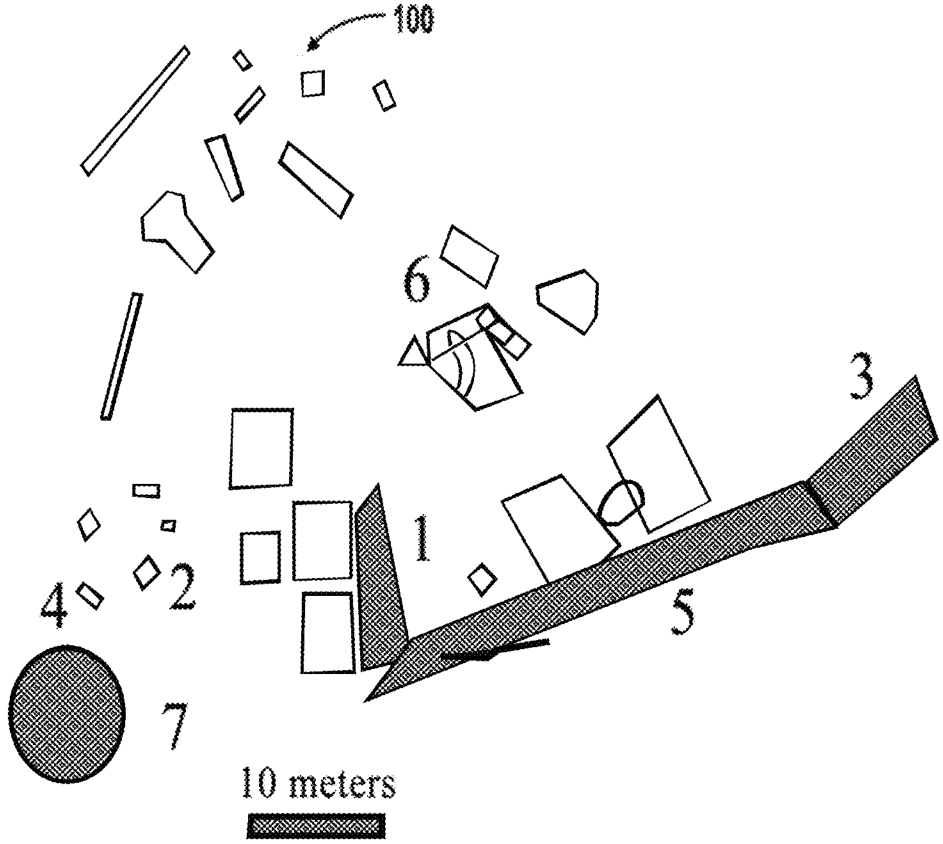
FIG. 1 shows an example of a representation of a polygon-based digital auditory map, in accordance with embodiments of the invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The invention provides systems and methods for digital auditory mapping. Various aspects of the invention described herein may be applied to any of the particular applications set forth below. The invention may be applied as a part of a mapping system or site that disseminates information about an environment. It shall be understood that different aspects of the invention can be appreciated individually, collectively or in combination with each other.

The term "digital map" as utilized herein, generally refers to a dynamic representation of items configured in spatial and topological relations with each other, represented in a virtual sensory format.

The term "screen reader" as utilized herein, may refer to software applications that translate textual and graphical information displayed on a screen and re-present it to the user using synthesized speech. Screen readers are a form of assistive technology (AT) potentially useful to the blind, visually impaired, color blind, low vision, dyslexic, illiterate or learning disabled, often in combination with other ATs such as screen magnifiers and tools for manipulating font type, font size, contrast, and the like.

The term "Text to Speech (TTS)" as utilized herein, may refer to synthesized speech either generated through a speech API, or through a screen reader.

The term "geometry" as utilized herein, may refer to collections of points and vectors, for specifying geometrics A such as points, polygons, and lines, or collections of points, polygons, and lines.

The term "feature" as utilized herein, may refer to an object, data point, or any element present in a spatial map that consists of properties and geometries. It may also refer to any combination of the above.

The term "data-based" as utilized herein, may refer to an application that represents a collection of features representing a real-world environment, simulated environment, imaginary environments, or other sets of data that have one or more features.

The term "auditory icon" as utilized herein, may refer to a sound recorded from, or simulating the real-world environment, and that represents data through one or more auditory elements, such as pitch, volume, tambour, rhythm, or duration. For example, a footstep on a wooden surface representing a medium sized person with a hard-soled shoe walking on a wood surface IN A BUILDING.

The term "earcon" as utilized herein, may refer to a sound, or grouping of sounds that provide a symbolic representation of data. For example, the 'ding' when one receives a text message.

The term "spearcon" as utilized herein, may refer to a short message played through TTS.

The term "sonification" as utilized herein, may refer to using sound to represent data. Sonification may use non-speech audio to convey information or perceptualize data.

As utilized herein, terms "component," "system," "interface," "unit" and the like are intended to refer to a computer-related entity, hardware, software (e.g., in execution), and/or firmware. For example, a component can be a processor, a process running on a processor, an object, an executable, a section of a web page, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

Moreover, the word "exemplary" is used herein to mean serving as an example, instance, or illustration. Any aspect or design described herein as “exemplary” is not necessarily to be construed as preferred or advantageous over other aspects or designs. Rather, use of the word exemplary is intended to present concepts in a concrete fashion. As used in this application, the term “or” is intended to mean an inclusive “or” rather than an exclusive “or.” That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. In addition, the articles “a” and “an” as used in this application and the appended claims should generally be construed to mean “one or more” unless specified otherwise or clear from context to be directed to a singular form.

Digital auditory maps are usually provided as a single platform with built-in voicing features (e.g., self-voicing). This may require users to practice in order to get familiar with the default voicing feature. The digital auditory map of the present disclosure may advantageously allow users to utilize their own preferred screen reader or their own speech engines. For example, the digital auditory map may be provided as a web browser-based application utilizing the web speech API for text to speech, or the user’s existing screen reader through ARIA live regions.

Various aspects of the present disclosure may be applied to any of the particular applications set forth below or for any other types of applications or systems. Systems or methods of the present disclosure may be employed in a standalone manner, or as part of a package.

FIG. 1 shows an example of a representation of a digital auditory map 100, in accordance with embodiments of the invention. In some embodiments, the digital auditory map 100 may include a geometries-based map where physical objects in the real-world may be represented by 2D polygonal regions, points, and/or lines, within a map. The digital auditory map may represent a real physical environment a user may wish to explore virtually. A user may be blind, visually impaired, color blind, low vision, dyslexic, illiterate, learning disabled, using a voice assistant or other individuals who may wish to utilize a nonvisual map.

The environment may include an indoor environment, outdoor environment, fantasy environment, or a combination of the above. Examples of environments may include, but are not limited to, playgrounds, parks, indoor play structures, shopping malls, airports, stores, schools/campuses, sporting arenas, convention centers, performing arts centers, museums, zoos, aquariums, continents, cities, planets, literary environments, or any other types of space or structures. The environment may comprise any type of area where taking a virtual tour or viewing a visual map ahead of time or onsite may be useful. This may include areas of any size (e.g., large regions, medium sized regions, or smaller regions). This may include areas of varying levels of traffic or density. The environment may include one or more physical objects or structures (e.g., path, bridge, long ramp, roller slide, swing, etc.) and the like a user may walk over or interact with. The one or more physical objects or structures may be formed from varying materials. The one or more physical objects may optionally emit a sound when interacted with by a user or other individuals within the environment. For example, an environment may include road segments/paths, land cover such as bodies of water (e.g., rivers, oceans, lakes, swimming pools, etc.), administrative bodies (e.g., boundaries of states, countries, cities, parks, etc.), area designations (e.g., rural/urban/suburban, desert/mountains/forest, etc.), buildings, facilities, and various others. For example, as illustrated in FIG. 1, the data-based map may illustrate a playground map and the polygons may represent various objects or structures such as 1=Ava’s Bridge, 2=Climbing giraffe, 3=creek bridge, 4=KinderBells, 5=long ramp, 6=roller slide, 7=stepping sounds.

The data-based map may be generated based on map service data received from one or more sources (e.g., mapping applications, vendors) or map service. A map service may provide map information and other map-related data, such as two-dimensional map vector data, three-dimensional map vector data (e.g., traversable map with three-dimensional features, such as buildings), route and direction calculation (e.g., directions between two points for a pedestrian), real-time navigation data (e.g., turn-by-turn navigation data in two or three dimensions), location data, physical measurements (e.g., size of building or structures) and other geographic data (e.g., wireless network coverage, floor map, weather, traffic information, or nearby points-of-interest). In some cases, the map service data may also include localized labels for one or more objects (e.g., object names, points of interest, material or property attributes, coordinates, elevation, etc.). The one or more sources may include internal or external sources. For example, vector data may be obtained from external services, or internal systems, or storage devices. Other examples may include, but are not limited to, GPS assistance servers, wireless network coverage databases, geojson files, Open Street Map, business or personal directories, public sector (e.g., visitor center of a park, playground website, etc.), weather data, government information (e.g., construction updates or road name changes), or traffic reports. As described, the sources may also include physical measurements relating to the environment from an in-person visit. The physical measurements may optionally be used in combination with data from other mapping or data sources, such as satellite data or voting statistics. The one or more sources may include publicly or privately accessible data that may be accessed by a mapping system to aid in generation of the map layers.

The polygon map may be obtained directly from the aforementioned sources. Alternatively or additionally, at least a portion of the polygon map may be generated by the mapping system. For instance, a map rendering component may render geometries for the objects (i.e., sets of vertices and boundaries for drawing the objects) based on object graphs using various processes. In some cases, the map rendering component may perform various operations to refine the geometries such as smoothing transitions between objects segments, creating more realistic rounded corners at intersections of objects, or removing overlap between separate objects that do not intersect. In some cases, the map rendering component may use various operations to resolve boundaries between the geometries. For example, when combining data from different sources, the location data indicating object boundaries may not align perfectly and therefore there may be either gaps between the object geometries or overlap of the geometries. The map rendering component may use different operations for resolving boundaries between different geometries, depending on the types of objects.

In addition, in some cases the map rendering component assigns specific properties to the feature. For example, a boundary of a feature’s polygon can be set as a solid barrier such that when a user crosses over the boundary auditory feedback (e.g., an auditory icon) may be delivered to the user indicating the user collides with a feature. In another example, the boundary of a polygon can be set as having a permeable boundary such that a user can enter or exit the polygon, and auditory feedback may be provided to the user indicating the name of the feature (or features) that the user enters and exits. In another example, the feature may be connected with a data only layer and assigned an attribute, or set of attributes, such as number of people with disabilities and or number of eligible voters.

The one or more features may be representative of physical real-world objects within the environment. The shape of the feature's geometries (e.g., points, lines, polygons) may be representative of the shape of the real-world object (although the shape of the geometry need not accurately match the shape of the real-world object). A user may also step on/over or interact with the real-world object represented by the feature. A geometry may also be provided for any other type of object, such as boundaries, and so forth.

A user may interact with the digital auditory map by navigating within the vector-based or geometries-based map and receive auditory feedback. In some cases, one or more of the polygonal regions may be associated with auditory data related to, for example, the name of the object corresponding to the polygonal region, the coordinates and various other attributes. For instance, a polygon representing an object in a playground (e.g., swing, swimming pool, long ramp, etc.) may store data about the name of the object, and the coordinates of the object. In another example, a polygon representing a road segment may store data defining the location and properties of roads. For instance, a road segment is assigned one or more names (e.g., "long ramp", "Lincoln Blvd.", "CA-I"), location data that indicates the path of the road segment or coordinates, and attributes of the road (e.g., surface type, materials, speed limit, width, number of lanes, road type, etc.). In other examples, a building polygon may store the location of buildings as well as data about the buildings. For instance, the building data may include ground elevation data and surface elevation from which building height may be calculated.

The auditory data may be played indicating the coordinates, location, name of the object and/or the sounds associated with the object. In some cases, the auditory data may be related to one or more properties/attributes of the object (e.g., materials, environment around the object, size of the object, population of the object, functionality of the object, etc.). The sounds associated with the object may be realistic sounds of the object or sonification of the numeric values. In some examples, the sounds associated with the object may include sounds that would be emitted from the object when a user or other individuals would interact with the object. The realistic sounds associated with the object may include real-world sounds that were recorded for the object or within a close proximity of the object. For example, if the object is 'bells', the realistic sounds may include recorded sounds of the bells ringing. In some instances, the sounds may include synthetic or computer-generated sounds that may be representative of the object. For example, the sound may be played based on the location in the digital map indicating the ambient environment at the location and/or sounds associated with the object (e.g., swimming pool, playground object, etc.). In another example, a feature may have a numeric property, such as population, and when a user enters the polygon of the feature, an earcon (e.g., a single pitch) is played representing the numeric data. The sounds may be captured from the real-world and/or synthesized.

In some embodiments, the sounds may be representative of an action to be taken in relation to the object and/or properties of the object. For example, if the object is a road and the user would typically step on the road, the sounds may include the sound of footsteps on the road. Depending on a property of the road, such as the materials, different types of footstep sounds may be played. For example, the sound of walking on wood may make a different sound compared to walking on cement.

In some cases, auditory data may be stored as a property of the feature objects. The auditory data may be played when a user encounters a polygon region. For example, when a user enters or exits a boundary of a feature's polygon, sounds and TTS may be played indicating the name or other properties of the feature that the user enters or exits. Any other spearcon or recorded sounds can be played.

In some cases, the auditory data may be played with respect to different navigational modes (e.g., first person mode, tree mode, grid mode) of the digital auditory map. For example, in a first-person mode, if the user navigates into a polygonal region corresponding to an object such as a long ramp having a material attribute as "wood", sound mimicking footsteps on wood materials may be played when the user "walks" over the object. In another example, in the grid mode, when a user steps on a tile within a portion of a polygon, an TTS spearcon indicating the name of the object and coordinates of the object may be played. Details about the different navigational modes are described later herein. The Javascript function that accepts the user's input to select the navigation mode is handleUserInput (event) as disclosed in the code listing in Appendix 1.

The digital auditory map can be navigated or virtually explored at adjustable scale or zoom level. Both the polygon shapes, sizes and the associated auditory data may be dynamically presented/played at different zoom levels/scales of the digital auditory map. For example, shape of the polygon may be based on the area of the polygon divided by the perimeter of the polygon, multiplied by a scaled factor. In another example, users may experience with higher level of granularity, i.e., greater detail, in terms of the shape of the polygon region as well as the auditory sounds of the environment and footsteps when zoom in. Features may be filtered based on the zoom level. Details about the different zoom levels are described later herein.

Figure 2A:
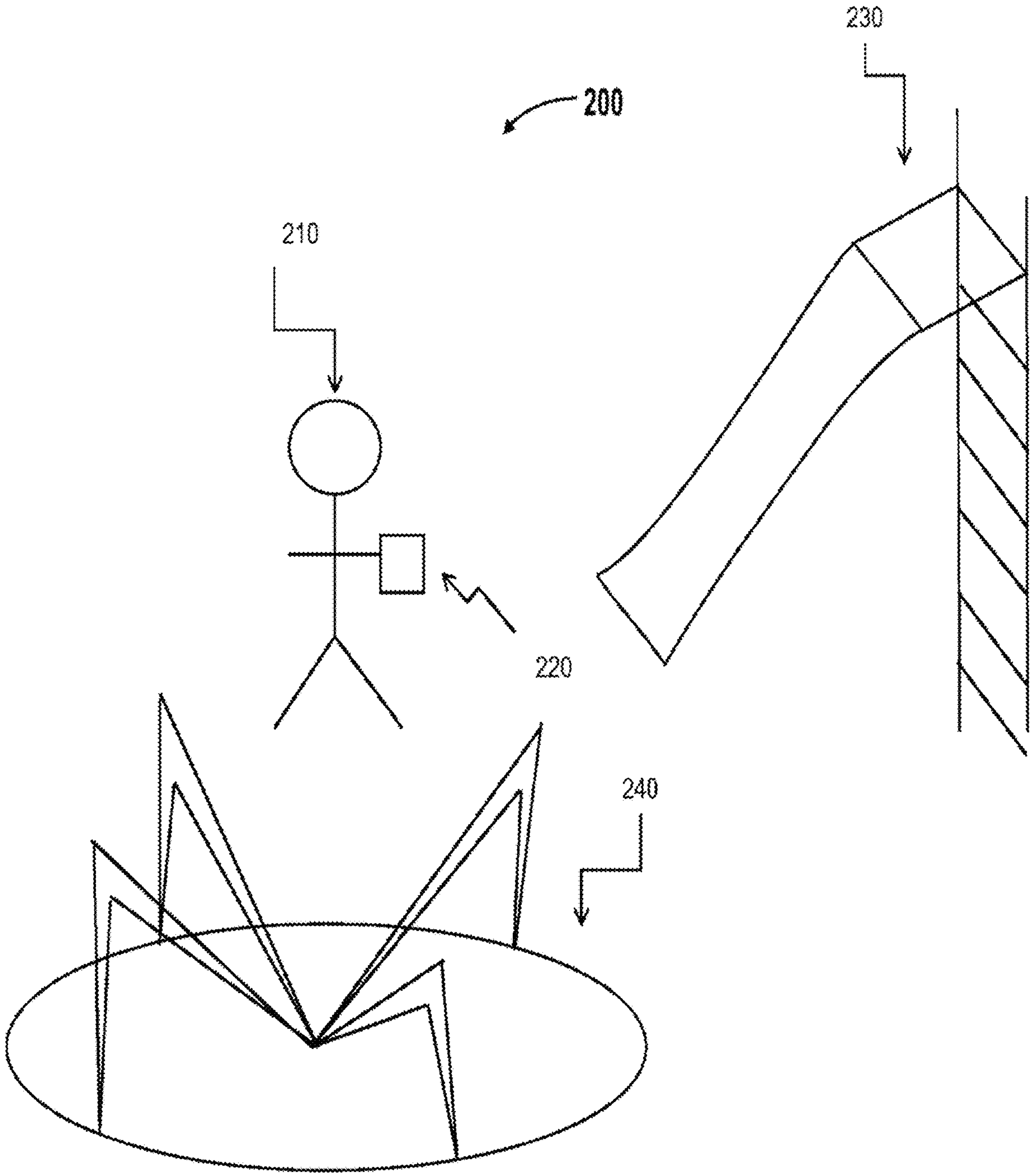
FIG. 2A and FIG. 2B show an example of a user navigating an environment with aid of a digital auditory map, in accordance with embodiments of the invention.
Figure 2B:
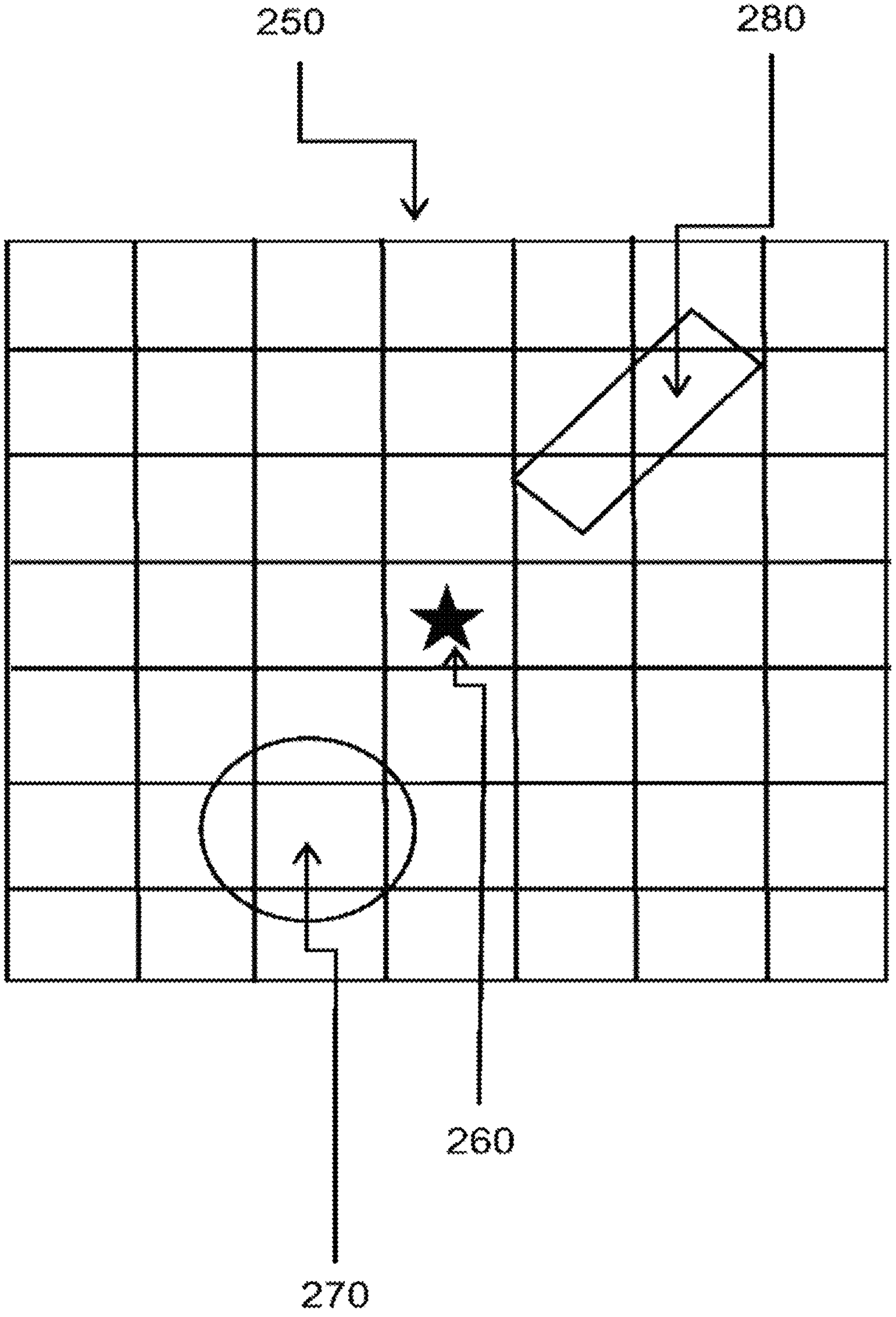

FIG. 2 shows an example of a user 210 navigating an environment 200 with aid of a digital auditory map 250, in accordance with embodiments of the invention. A user may access the digital auditory map through a web browser (e.g., business website) to learn about an environment.

The user may access the digital auditory map at any location remote from the environment to be explored. For example, a user may access a playground website to practice on the digital auditory map ahead of time in order to get familiar with the environment before visiting or while navigating the physical space. The user may access any site relating to an environment to be explored through a browser or application. The user may be able to virtually explore an environment before physically visiting an environment, which may advantageously provide the user with some familiarity ahead of time. Accessing a digital auditory map ahead of time may allow the user to understand the spatial layout and associated sounds in the space before physically venturing into the location. The digital auditory map may or may not have a corresponding visual or other sensory representation that may be displayed on a user device.

Alternatively or in addition to, a user may use the digital auditory map for real-time navigation. For example, a user 210 may navigate the environment 200 with aid of the digital auditory map 250 in real-time. The user may have a portable user device 220 which may provide access to the digital auditory map 250. The user device may be any type of device such as a computing device configured to perform one or more operations consistent with the disclosed embodiments. Examples of user devices may include, but are not limited to, mobile devices, smartphones/cellphones, tablets, personal digital assistants (PDAs), laptop or notebook computers, desktop computers, media content players, television sets, video gaming station/system, virtual reality systems, augmented reality systems, microphones, or any electronic device configured to enable the user to access the digital auditory map. The user device may be a handheld object. The user device may be portable. The user device may be carried by a human user. In some cases, the user device may be located remotely from a human user, and the user can control the user device using wireless and/or wired communications. The user may use the user device to access the digital auditory map at any point, such as prior to entering the environment, at an entrance to the environment, or while the user is navigating within the environment.

In the illustrated example, a real-time location of the user 210 may be tracked by a user device 220. The real-time location of the user may be mapped to the current location 260 on the digital auditory map 250, and auditory feedback associated with the features 270, 280 may be played when the user is detected to be entering a polygonal region corresponding to the features 220, 230. For example, when a location of the user is detected to be at a geo-boundary of the polygonal region representing the feature 230, a short auditory message about the name of the feature may be played.

In some embodiments, a user may be able to virtually navigate the environment while physically at or within the environment. The real-time location of the user may optionally be automatically updated in relation to the digital auditory map. In some instances, the real-time location of the user may only be updated upon command from the user. For example, the user may be at a particular location within the environment, and the user may input a command that may allow the virtual representation of the user to 'jump' to the same corresponding location within the map. From that location, the user may choose to virtually navigate within the environment without requiring the user to physically move within the space. The location of the virtual representation of the user within the digital auditory map need not directly correlate to the physical location of the user within the environment. The user may select an option to synchronize the location of the virtual representation of the user within the map with the physical location of the user in the environment. The user may be permitted to switch between a real-time navigation mode based on physical location of the user and a virtual navigation mode based on user-inputted location.

The real-world location of the user can be tracked by using any suitable devices or methods. For example, the real-world location may be tracked using locating component of the user device such as a global positioning system (GPS), a camera utilizing computer vision, or beacons. In some cases, differential global positioning system (DGPS) sensor and/or IMU may be used to assist the user in navigating its environment and determining the orientation/position of the user with respect to a global reference frame. Any description herein of a DGPS sensor may apply to any type of GPS sensor. The DGPS sensor can communicate with one or more ground based reference station and/or GPS satellites to obtain one or more GPS data signals. Location detection may occur in reference to GPS coordinates. The DGPS system may preferably use a network of fixed, ground-based reference stations to broadcast the difference between the positions indicated by the GPS satellite systems and the known fixed positions. The stations may broadcast the difference between the measured satellite pseudoranges and actual (internally computed) pseudoranges, and receiver stations may correct their pseudoranges by the same amount. The DGPS sensor can utilize any suitable GPS technology, such as differential GPS (DGPS) or real time kinematic (RTK) GPS. The GPS sensor can be configured to determine the position of the user to any suitable level of accuracy, such as meter-level accuracy (e.g., within 10 m, 5 m, 2 m, or 1 m of accuracy) or centimeter-level accuracy (within 500 cm, 200 cm, 100 cm, 50 cm, 20 cm, 10 cm, or 5 cm of accuracy). Other location techniques such as computer vision and other location sensory (e.g., accelerometer, gyroscope and magnetometer) can also be used to track the user's movement and/or location.

In some cases, other real-world locating methods or systems such as Beacon devices for indoor/outdoor positioning may be utilized. In some cases, the environment may be facilitated with beacons for indoor/outdoor position tracking, such as populating the indoor/outdoor space with Bluetooth Low Energy (BLE) beacons or alternatively UWB anchors that transmit a continuous stream of packets that are picked up by a BLE transceiver or an UWB transceiver on the user device. For instance, with BLE, a position of the user device (e.g., mobile device, wearable devices) can be identified based on the proximity technology. The proximity technology may include a plurality of beacons distributed about a premise through which an individual is located or to navigate. The mobile device may be BLE compatible so as to determine an individual's relative physical location to a beacon. Based on ranging data or approximate distance between user's device to each beacon along with the unique beacon's properties, different level of positioning accuracy can be achieved. For instance, the proximity technology may determine the location of a mobile device based on a proximity estimate of signal strength emitting from a beacon. In addition, it can be enhanced with a beacon triangulation method to determine the (x, y, z) local map coordinates of an individual's position referencing the proximity of three or more beacons. The receiver can estimate its position using the average of x, y, z, which is the localized coordinates of a floor map for e.g. (x1, y1, z1), (x2, y2, z2) and (x3, y3, z3). The real-time locating system may employ any suitable ranging and/or angulating methods which may include, for example, angle of arrival, angle of departure, line-of-sight, time of arrival, time difference of arrival, two-way ranging, symmetrical double sided two way ranging, near-field electromagnetic ranging or any combination of the above. The real-world locating system may utilize any suitable technologies to provide real-time locating, including but not limited to, ultra-wideband (UWB) technologies, ultrasound-based RTLS technologies, GPS-enabled RTLS, Wireless local area network, Bluetooth, and various other technologies to provide location tracking or proximity measurement. The accuracy may range from, for example, 0.1 m to 10 m.

The virtual location of the user within the digital auditory map may be provided with any degree of precision and/or accuracy. As described above, a user may input a command that may allow a virtual representation of the user to 'jump' to the same corresponding location within the map. For example, the command may indicate a location relative to an object such as 'north side of swimming pool,' coordinates of a location or a region within the map such as 'south region of the park.' The user could also jump to a position within a feature, such as the center.

Figure 3:
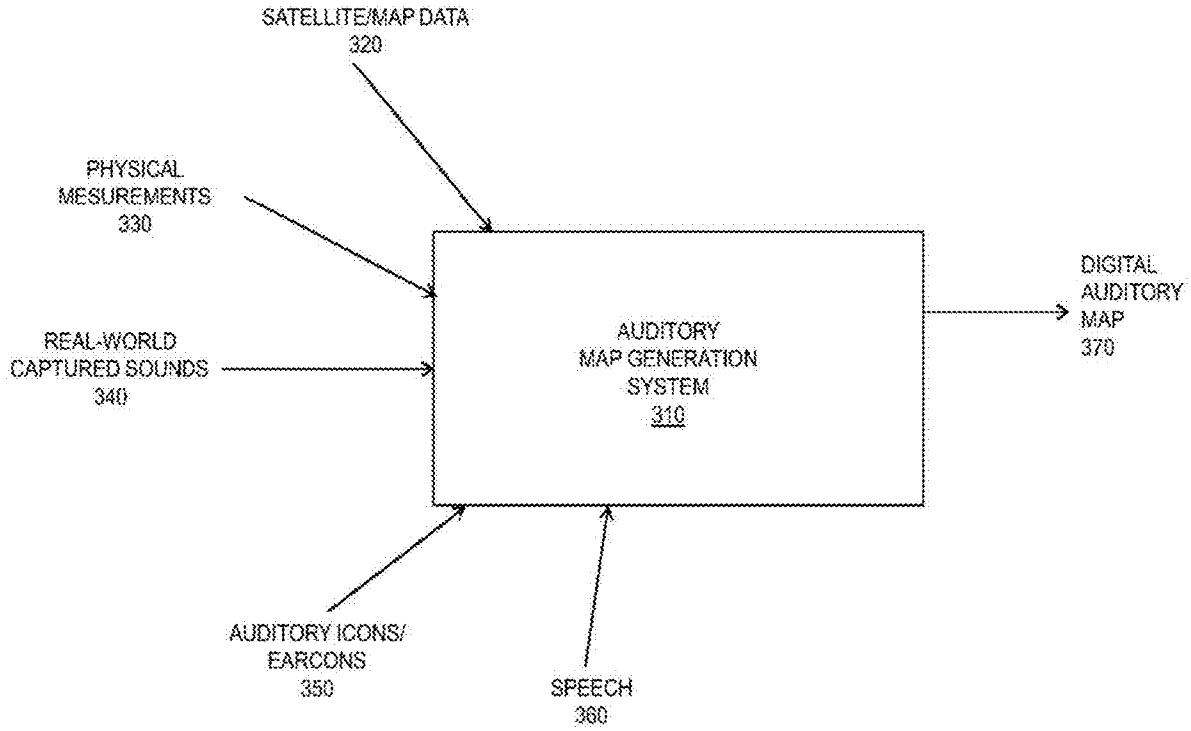
FIG. 3 shows examples of information that may be integrated or used to formulate a digital auditory map, in accordance with embodiments of the invention.

FIG. 3 shows an example of an auditory map generation system 310 configured to generate a digital auditory map, in accordance with embodiments of the invention. In some cases, the auditory map generation system 310 may generate a digital auditory map 370 based on map service data such as satellite or map data 320, physical measurement 330, and auditory data such as real-world sounds 340, auditory icons/spearcons 350, and speech data 360.

In some embodiments, the auditory map generation system 310 may include a map rendering component to generate a polygon map. The polygon map can be the same as the geometries-based map as described elsewhere herein. The map rendering component can be the same as the map rendering component as described in FIG. 1. For example, the polygon map may be generated based on map service data received from one or more sources (e.g., mapping applications, vendors) or map service. A map service may provide map information and other map-related data, such as two-dimensional map vector data 320 (e.g., aerial view of a park utilizing satellite imagery converted to numeric vectors), three-dimensional mesh data (e.g., traversable map with three-dimensional features, such as buildings), physical measurements 330, route and direction calculation (e.g., directions between two points for a pedestrian), real-time navigation data (e.g., turn-by-turn visual navigation data in two or three dimensions), location data, and other geographic data (e.g., wireless network coverage, floor map, weather, traffic information, or nearby points-of-interest). In some cases, the map service data may also include localized labels or metadata for one or more objects (e.g., object names, points of interest, attributes, coordinates, elevation, etc.). The one or more sources may include internal or external sources. For example, vector data may be obtained from external services, or internal systems, or storage devices. Other examples may include, but are not limited to, GPS assistance servers, wireless network coverage databases, business or personal directories, public section (e.g., visitor center of a park, etc.), weather data, government information (e.g., construction updates or road name changes), or traffic reports.

As described above, the polygon-based map and its properties may be obtained directly from the abovementioned sources or generated by the map rendering component. The map rendering component may render geometries for the objects (i.e., sets of vertices and boundaries for drawing the objects) based on object graphs using various processes. For instance, the map rendering component may perform various operations to refine the geometries such as smoothing transitions between objects segments, creating more realistic rounded corners at intersections of objects, or removing overlap between separate objects that do not intersect. In some cases, the map rendering component may use various operations to resolve boundaries between the geometries. For example, when combining data from different sources, the location data indicating object boundaries may not align perfectly and therefore there may be either gaps between the object geometries or overlap of the geometries. The system uses different operations for resolving boundaries between different geometries, depending on the types of objects.

The map rendering component may assign specific characteristics to the polygon vertices and/or edges. For example, a boundary of a polygon can be set as solid barrier such that when a user crosses over the boundary auditory feedback (e.g., an auditory icon) may be delivered to the user indicating the user collides with the edge a polygon. In another example, the boundary of a polygon can be set as a permeable boundary such that a user can enter or exit the polygon, and auditory feedback may be provided to the user indicating the name of the object that the user enters and exits. The auditory data may be generated using real-world captured sounds 340, auditory icons/spearcons 350 or speech 360.

The real-world captured sounds 340 may include sounds that were recorded/captured at the real environment (e.g., playground). This may beneficially provide a realistic experience that may help a user get familiar with the real environment. This may capture sounds associated with an object. This may capture sounds emitted by the object (e.g., sounds of bells if the object is the bells) and/or sounds at an environment proximate to the object (e.g., sounds of children's voices as is typically present near the bells).

The auditory icons 350 may include sounds representative of actions (e.g., footsteps make different sounds when on different types of surfaces/materials, or generic sounds of a user bumping into an object), and the like. The auditory icons 350 can include real-world recorded sounds or synthesized sounds.

The speech 360 may include text describing the object (e.g., name of the object), coordinates, warning messages, information about entering or leaving objects, and the like that can be translated into audio speech using the user's own screen reader, or a provided TTS engine.

The auditory data may be related to the object such as the name of the object, the coordinates or locations and/or one or more attributes of the object. The auditory data may be played indicating the coordinates, location, name of the object and/or the real-world sounds associated with the object. In some cases, the auditory data may be related to one or more properties/attributes of the object (e.g., materials, environment around the object, functionality of the object, etc.). For example, the sound may be played based on the location in the digital map indicating the ambient environment at the location and/or sounds associated with the object (e.g., swimming pool, playground object, etc.).

In some cases, auditory data may be stored with the polygon objects. The auditory data may be played when a user virtually encounters a polygon region within the digital map or based on a real-time location of the user. For example, when a user enters or exits a boundary of a polygon region, a spearcon may be played indicating the name of the region that the user enters or exits, or a recorded sound associated with the object may be played.

In some cases, the auditory data may be played with respect to different navigational modes (e.g., first person mode, tree mode, grid mode) of the digital auditory map. For example, in a first-person mode, if the user navigates into a polygonal region corresponding to an object such as a long ramp having a material attribute as "wood", sound mimicking footsteps on wood materials may be played when the user "walks" over the object. In another example, under the grid mode, when a user steps on a tile with a portion of a polygon, an auditory feedback indicating the name of the object and coordinates of the object may be played. In another example, under the tree mode, when a user moves over an object in the list, a sound may play representing a property of the object, along with the name of the object in speech.

A digital auditory map may have one or more navigational modes. In some embodiments, two or more, three or more, four or more, or greater numbers of navigational modes may be provided. In some embodiments, a digital auditory map may comprise a first-person mode, a grid mode, a tree-based mode or any combination of the above. The different navigational modes may efficiently assist users in navigating the digital auditory map with an improved user experience. In some instances, different navigational modes may suit different purposes. For example, a user may use the tree-mode to move between objects, use the grid mode to get information about the shape of the object or spatial information between objects, and use the first-person mode to walk routes between objects. Allowing for multiple navigational modes may advantageously allow users with different preferences to explore an environment in a personalized way that suits how they understand spatial relations.

Figure 4:
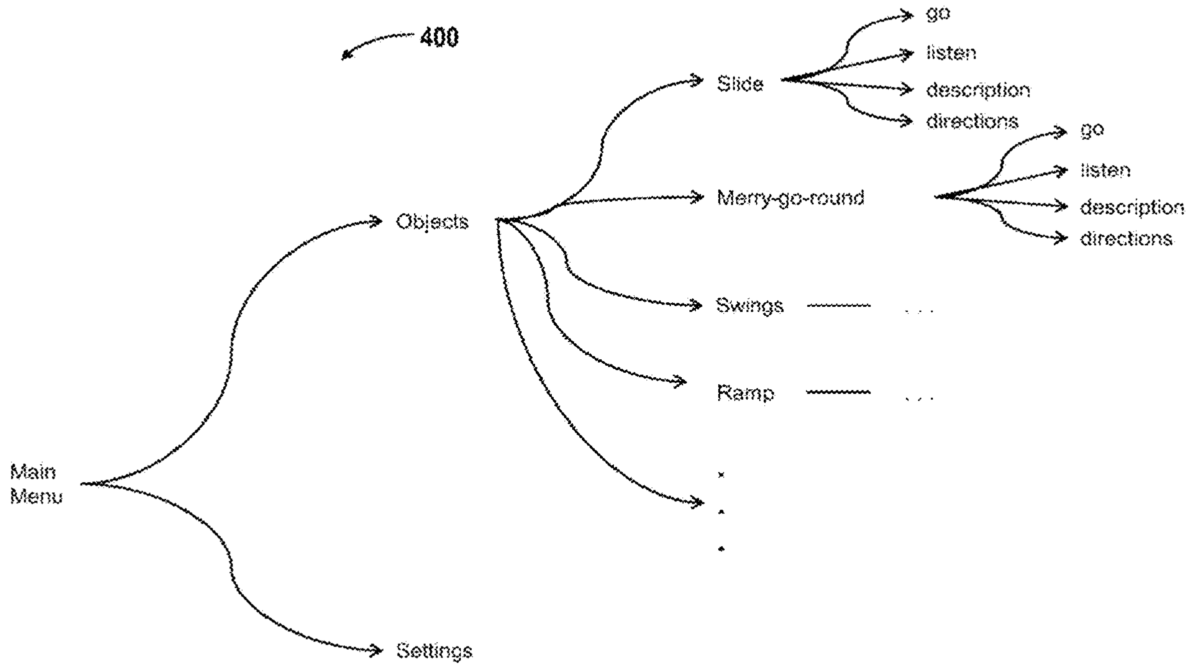
FIG. 4 shows an example of a tree-based mode of a digital auditory map, in accordance with embodiments of the invention.

FIG. 4 shows an example of a tree-based mode 400 of a digital auditory map, in accordance with embodiments of the invention. The tree-based mode may beneficially allow users to quickly jump to an object of interest. The tree-based mode may allow users to quickly move between objects (e.g., playground structures/features), navigate between different polygonal regions, and access detailed information associated with a selected object.

As illustrated in the example, the tree-based mode of the digital auditory map may include a hierarchical structure illustrating hierarchical parent-child relationships between various objects and settings within an environment. In some cases, the tree-based model may include a menu listing regions/objects and options users can select, and child menus with further options.

The tree-based mode can include menus with any number of levels (e.g., at least one, two, three, four, or more levels). A user may be permitted to select an object at any level and to explore details (e.g., location, shape, properties, function, etc.) about the object. In some cases, upon selection of an object (e.g., slide, Merry-go-round, Swings, Ramp, etc.), a menu including one or more function options such as 'go', 'listen', 'description', and 'directions' may be provided. The various function options may allow a user to listen to the sounds associated with the selected object, learn the detailed description about the object or directions to the object (e.g., location of the object or region).

In some cases, an auditory spearcon about the name attribute of the object may be played when the user moves through the menu. The 'go' function may take the user to the center of the object polygon and the user may virtually explore the environment starting from the center of the object polygon. The 'listen' function may permit the user to hear the sound associated with the object in isolation from other sounds. For example, if the user selects the 'listen' function, the user may hear sound about the object and/or the environment within proximity of the object. The 'description' function may permit users to hear the textual description of the object. The 'directions' function may permit the user to listen to the location of the object relative to the user's current position and the nearest point. In some cases, these functions may be provided in response to a user input such as keyboard input. For example, a user may press Enter on each object to bring up the submenu including the abovementioned functions. The user may press a keyboard shortcut such as "d" to quickly replay updated directions to the selected object relative to the user's current location.

The tree-based mode may also permit users to configure one or more settings of the digital auditory map. For example, a user may select different settings for virtual navigation (e.g., user preferred mode for virtual navigation, default zoom-level for grid mode, etc.) and real-time navigation (e.g., user preferred mode for real-time navigation), settings for audio (e.g., screen reader, user preferred voicing assistant, reading speed, volume, etc.) and various others.

Figure 5:
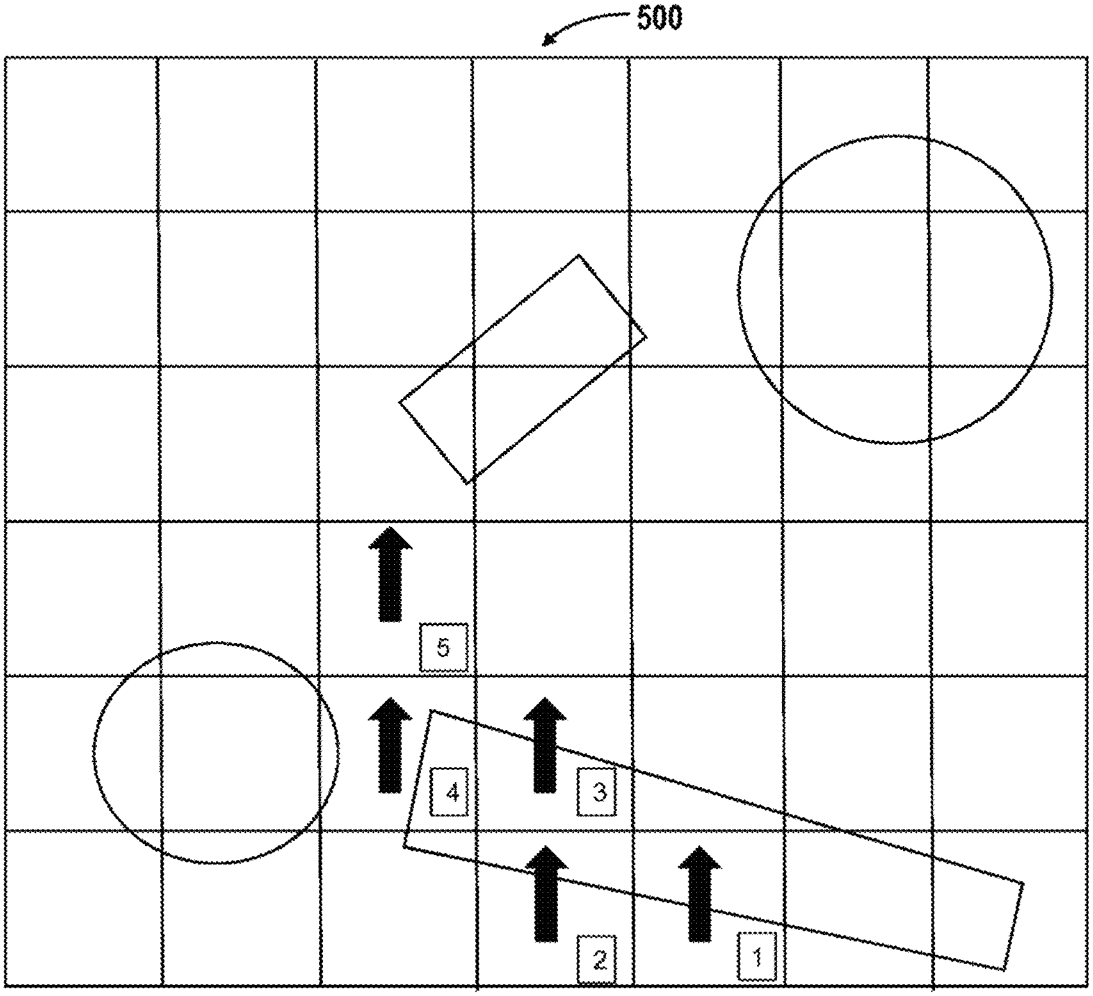
FIG. 5 shows an example of a grid-based mode of a digital auditory map, in accordance with embodiments of the invention.

FIG. 5 shows an example of a grid mode 500 of a digital auditory map, in accordance with embodiments of the invention. The grid mode may beneficially allow users to obtain shape information about object and spatial relationships between objects by sensing the boundary of a polygon region and distance between two polygon regions.

In a grid mode, the digital auditory map may be divided into a grid. A unit within a grid may be a tile or square. Varying zoom levels may be provided for the grid mode, which may provide a varying size of polygon and varying user movement.

In some cases, the unit of movement in the grid mode may be a tile or square. For example, if the user is represented by a single point, a unit of movement may move the user from [1,1] to [1,2] in a cartesian plane. Alternatively or additionally, a user may set up the unit of movement in the grid mode such as half tile or two tiles. As illustrated in the example, a user may input a user command (e.g., a keyboard command) and each movement step may be at the speed of a tile in the grid. A user may be able to dictate how quickly the user travels within the grid mode by moving from a tile to adjacent tile on command. This may beneficially allow a user to get an overview of an environment quickly. For example, a user may quickly press corresponding keys to navigate the tiles of the grid, or to do an overall scan of the environment.

In some cases, the grid mode may provide detailed auditory feedback and speech compared to the tree-based mode. For example, when a user moves to a new tile in the grid, a spearcon (e.g., short speech message) about the name attribute of the polygon followed by the coordinates may be played. The coordinates may be, for example, the index of a tile (x, y) in the grid. The unit of the coordinates may be, for example, index of a tile, meter, latitude, or longitude or others. In another example, when a user enters a tile with at least a portion of the polygon, an auditory icon may be played. The auditory icon may be generated using real-world recordings of the object or synthesized sound. In some cases, the spearcon and the auditory icon may be played together.

In some cases, the orientation of the grid mode may be locked. When a user switch from the grid mode to the first-person mode, the orientation may not change thereby preventing disorientation. In other cases, switching between first-person and grid mode may preserve the last orientation the user had when they were in a mode.

Figure 6:
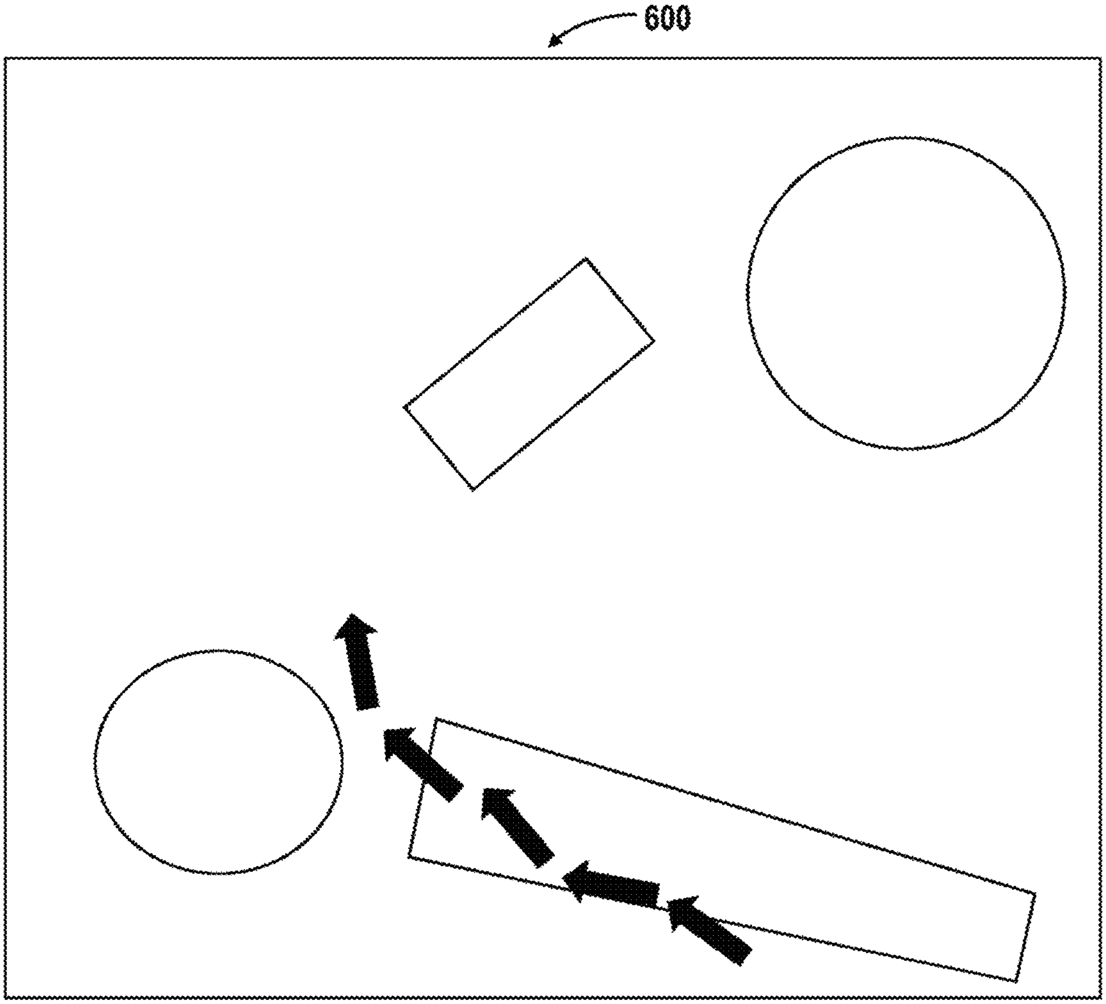
FIG. 6 shows an example of a first-person-based mode of a digital auditory map, in accordance with embodiments of the invention.

FIG. 6 shows an example of a first-person mode 600 of a digital auditory map, in accordance with embodiments of the invention. The first-person mode may beneficially provide detailed experience at a current location of the user. For example, a user may be provided with positions of objects around through auditory icons, and/or footsteps that indicate the type of terrain and walking speed thereby providing a realistic connection to the real world.

In some cases, the first-person mode may have a user-selected orientation. For example, a user may set up the top of a playground map facing the user as north. A user may change the orientation of the first-person mode at any time. In some cases, once the orientation is set, the orientation may be locked while the user is navigating the digital map to prevent disorientation.

In some cases, a user may set up a moving speed navigating the digital map by changing the speed or size of the movement (e.g., footsteps). For example, a user may press and hold an arrow key to use the footsteps to walk a specified distance every 0.3 seconds. A default moving speed may be provided. The moving speed may be increased or decreased by user preference. The distance moved every step may be changed based on the zoom level.

As illustrated in the example, when the user enters a polygon, a recorded label may be played saying the name of the object. In some cases, if the terrain/material attribute of the object (e.g., wood) is available, the footsteps of the materials may be played when the user walks over the object. In some cases, multiple objects may overlap such that at least one object may be on top of another. For example, objects can be placed on, at, or within an object having a type attribute of "room". In such cases, a phrase may be created, organizing the objects at the user's location, based on the object's attributes. For example, a phrase may be "Entering Roller Slide at the Slide Mound" where the Roller Slide has a type attribute of "room" and Roller Slide has a type attribute of "object". The phrase may be created by a phrase creation algorithm of the provided system.

The digital auditory map may permit users to seamlessly switch among the multiple navigational modes as described above. For example, a user may switch from a tree-based mode to the grid mode or first-person mode to explore the shape and spatial information about an object selected in the tree-based mode. The tree-based mode may allow a user to quickly 'jump' to an object, while the grid mode or first-person mode may allow a user to explore the environment around the object. In another example, a user may toggle between a grid mode and a first-person mode to explore an environment at different granularity levels. The user may be able to scan through an environment quickly in grid mode and explore the environment in a more realistic setting by switching to first person mode, and vice versa. Providing multiple modes as provided may increase the functionality of the digital auditory map and allow a user to virtually tour the environment in a manner that is suited to the user's preferences.

In some cases, when switching between a grid mode and a first-person mode, at least the footsteps/zoom level and/or orientation may be preserved such that a user may not be disorientated. For example, when a user switches from a grid mode to a first-person mode, the speed and zoom level in the grid mode may be maintained and the user may seamlessly continue navigating in the first-person mode at the same speed, zoom level, and heading towards the same direction.

In some instances, when a user switches from the grid mode to the first-person mode, the user may remain oriented in the primary direction (same to the grid mode). In some cases, when the user switches from the first-person mode to the grid mode, the map may be automatically oriented to align to the primary direction of the grid mode if the first-person orientation was different.

Figure 7:
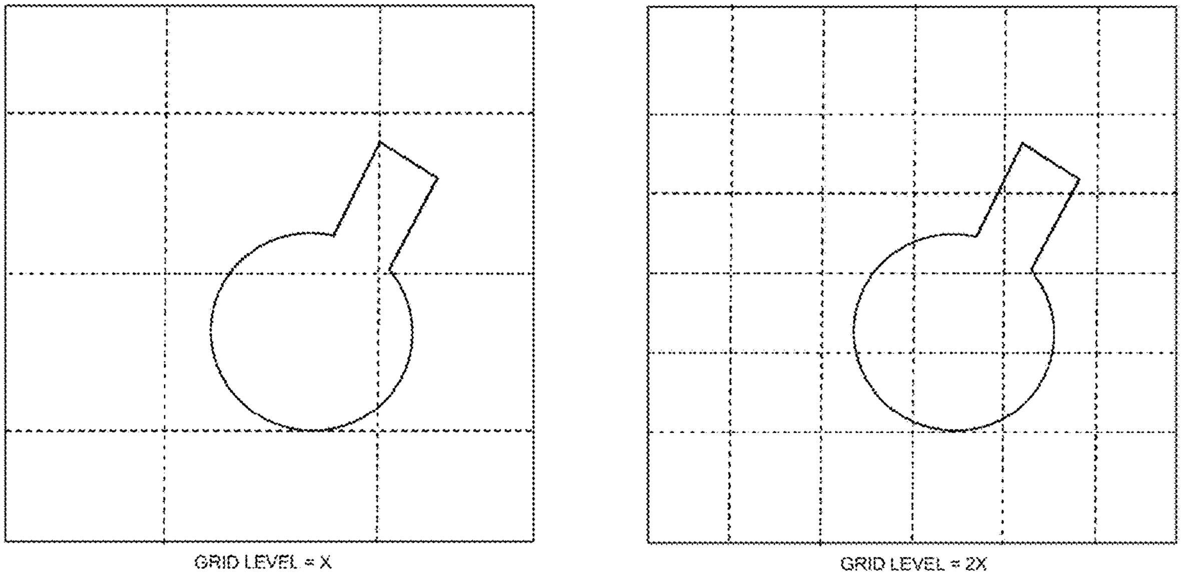
FIG. 7 shows a representation of varying zoom levels, in accordance with embodiments of the invention.

As described above, the digital auditory map can be navigated at varying zoom level/scales. FIG. 7 shows a representation of varying zoom levels, in accordance with embodiments of the invention. In some cases, at least the first-person mode and grid mode may have variable zoom levels. A user may adjust the zoom level during navigation. In some cases, different zoom levels may include the vector-based map with graphs presented with corresponding scales and auditory data with different details. The zoom factor can be in any range such as from 0.1× to 50×.

In both the illustrated grid mode and first-person mode, when a user zooms in (e.g., 2×), the step size may become smaller so the user can experience with higher level of granularity the shape of the object, the geographic locations and the corresponding auditory feedback. Zooming in may have a similar effect as 'shrinking' a user within the environment to allow for finer, more detailed, exploration. The sounds of the footsteps (e.g., speed or frequency) relative to the ambient/background environment may also change according to the zoom level.

Figure 8:
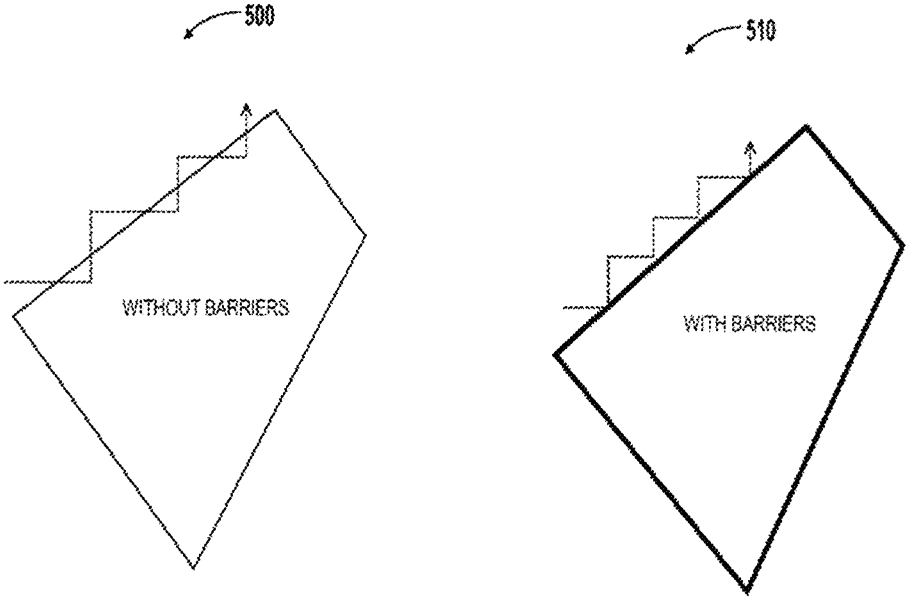
FIG. 8 shows examples of how polygonal representations on the digital map may have permeable or solid boundaries, in accordance with embodiments of the invention.

In some embodiments, the digital auditory map may be designed with barriers of objects to allow users to sense the shape of the geometry region with improved efficiency. FIG. 8 shows examples of how polygonal representations on the digital map may have permeable or solid boundaries 510, in accordance with embodiments of the invention. In some embodiments, the boundary of the polygons may act as a barrier such that when a user hits/collides with the barrier, an auditory feedback may be played such that a user may rapidly sense the shape of the polygonal region without entering or exiting the region.

As illustrated in the example 500 where the polygon-based map does not have barriers, a user may not hear auditory feedback until the user crosses over a boundary i.e., entering/exiting a polygon. As shown in the example, this may take more steps and/or more time for a user to sense the shape of the polygon. In the polygon-based map with solid barriers such as shown in the example 510, when a user hits a barrier in solid mode, there may be auditory cues (e.g., an auditory icon) indicating the user collides with a boarder. In such scenarios, the user may sense the shape by repeatedly moving in the direction they are able to go and colliding with the boarders of the geometry. Having the boarder reduces the number of key presses needed to explore a shape in half, because the user does not need to retrace their movement if they exit the geometry. In some instances, auditory feedback may be provided when a user collides with a barrier in solid mode. In some cases, the solid boundary can be detected by a distancing sensor that may also indicate the location of the user relative to the solid boundary in both direction and distancing. For example, a radar may be used that plays a repeated sound every specified number of degrees spanning an area surrounding the user. If the radar does not sense a barrier, a gentle sound may be played indicating an empty space. When the radar hits a barrier, the sound may turn into a substantive beep in the direction of the barrier. In another example, different pitches may be played for different directions where there is a barrier. For example, a barrier to the left of the user may be specified by a solid tone of 261.6 HZ and a barrier in front of the player may be specified as 329.63 HZ. In some cases, multiple pitches may be played together indicating the user may be surrounded by barriers in multiple directions (e.g., user is at a corner). The sound of the barrier tones may get louder as the user moves closer to the barrier.

In some instances, all of the geometries (e.g., polygons, points, lines, etc.) within a digital auditory map may be in permeable mode. In some instances, all of the geometries within a digital auditory map may be in a solid mode. A user may optionally be presented with options to switch between permeable and solid modes based on user preferences. In some instances, optionally, one or more geometries may be presented in permeable mode while one or more other geometries may be presented in a solid mode. In one example, a polygon representative of an object that may be stepped on or over (e.g., path, ramp, etc.) may be presented in a permeable mode while an object that may extend vertically that a user would not be able to step over (e.g., slide, swings, etc.) may be presented in a solid mode. Input about object types may be provided when initially generating the digital auditory map, and the geometries may have different borders depending on object type.

The present digital auditory map system may advantageously permit users to use their own screen reader to deliver the auditory feedback. In some embodiments, the digital auditory map system may be implemented as a web-based application utilizing the Web Speech API to provide TTS, or use an ARIA live region to conveniently interface with the user's existing screen reader. An ARIA live region is a simple mechanism for notifying screen readers when content is updated on the page. For example, a screen reader can only focus on one part of a page at a time. If something changes elsewhere on the page, the screen reader user may be oblivious to it. When the update takes place within an ARIA live region, a screen reader is automatically notified (wherever its focus is at the time), and it conveys the updated content to the user. The digital auditory map may be available for all major desktop browsers like Chrome, Firefox, Safari, Microsoft Edge and Opera, etc.

In some cases, the digital auditory map may be offered as a component that can be embedded into a third-party webpage. A user may be provided with a uniform resource locator (URL) that directs to a version of the map of the present disclosure. The user can insert the URL into a desired webpage through an iframe.

In some cases, the digital auditory map may be installed as a package that can be accessed programmatically by other applications. For example, users may install the package from the Node Package Manager (NPM) and import the package into a desired webpage application. The user may then use functions, classes, and other features of the package in the desired applications. In some cases, the package may require authentication and functionality through an external server.

In some cases, the digital auditory map may be a software application implemented in a combination of one or more programming languages and markup languages for execution by various web browsers. For example, the client software can be executed in web browsers that support JavaScript and HTML rendering, such as Chrome, Mozilla Firefox, Safari, and any other compatible web browsers. The various embodiments of software applications may be compiled for various devices, across multiple platforms, and may be optimized for their respective native platforms.

In some cases, the digital auditory map system may include a user interface (UI) module. The user interface (UI) module may provide a graphical user interface (GUI), along with an auditory user interface (AUI) that can be integrated into other applications. A user may provide user input (e.g., navigation in the map, interaction with a graphical element on the map, etc.) via the GUI, programmatically, through a webhook, or through an input device such as a keyboard. The user interface may utilize one or more user input devices (e.g., mouse, joystick, keyboard, trackball, touchpad, button, verbal commands, gesture-recognition, attitude sensor, thermal sensor, touch-capacitive sensors, accelerometers, gyroscopes, speech recognition, or any XR (AR/VR/MR) devices).

Figure 9:
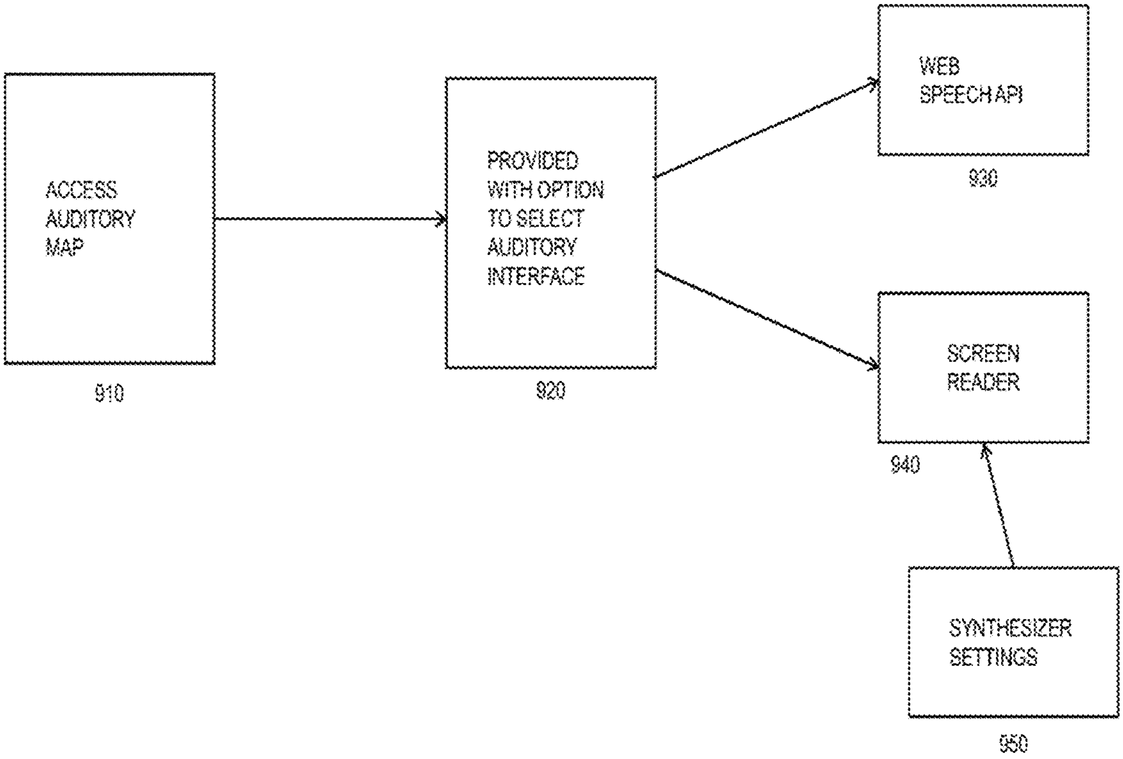
FIG. 9 shows a flow chart of an exemplary process for user to select and use different auditory options, in accordance with embodiments of the invention.

FIG. 9 shows a flow chart of an exemplary process for user to select and use different auditory options, in accordance with embodiments of the invention. A user may access the digital auditory map 910 and may be provided with options for the user to select a preferred auditory interface 920 for playing the audio. For example, a user may select a synthesizer from the Web Speech API 930, their screen reader 940, or any other existing software synthesizers 950.

The Web Speech API is agnostic of the underlying speech recognition and synthesis implementation and can support both server-based and client-based/embedded recognition and synthesis. A Web Speech API typically has two functions, speech synthesis, otherwise known as text to speech, and speech recognition. With the SpeechSynthesis API, a browser is able to read out any text in a number of different voices. A user may be permitted to select a user preferred voice within the browser enabled by the Web Speech API. As described above, screen readers are software programs (e.g., Job Access With Speech, Nonvisual Desktop Access, Voice Over, Talkback, Chrome Vox, Speakup, Orea, etc.) that allow blind or visually impaired users to read the text that is displayed on the computer screen with a speech synthesizer or braille display. Each screen reader may incorporate a different command structure, and most support a variety of speech synthesizers. A user may choose to use screen reader or the Web Speech API based on the availability of the software programs, preferred input methods (e.g., keystrokes, voice commands, or gestures) or user preferred settings (e.g., voice).

A user may be permitted to choose their preferred voicing, language or accent. For example, a user may choose an existing voice, gender, language, and accent from the options provided by the Web Speech API.

In some cases, two or more of the Web Speech API, Aria Live Regions, internally packaged synthesizer, recordings, or externally generated speech can be used simultaneously. For example, in the first-person mode, entering and exiting labels may be presented using the Web Speech API, and all other speech may be presented using Aria live regions (through the user's own screen reader).

In some cases, the digital auditory map system may be implemented in a distributed computing environment, such as over the cloud. The digital auditory map system may include services or applications that run in the cloud or an on-premises environment to perform one or more methods consisted with those described herein. This digital auditory map system may run in one or more public clouds (e.g., Amazon Web Services (AWS), Azure, etc.), and/or in hybrid cloud configurations where one or more parts of the system run in a private cloud and other parts in one or more public clouds.

Figure 10:
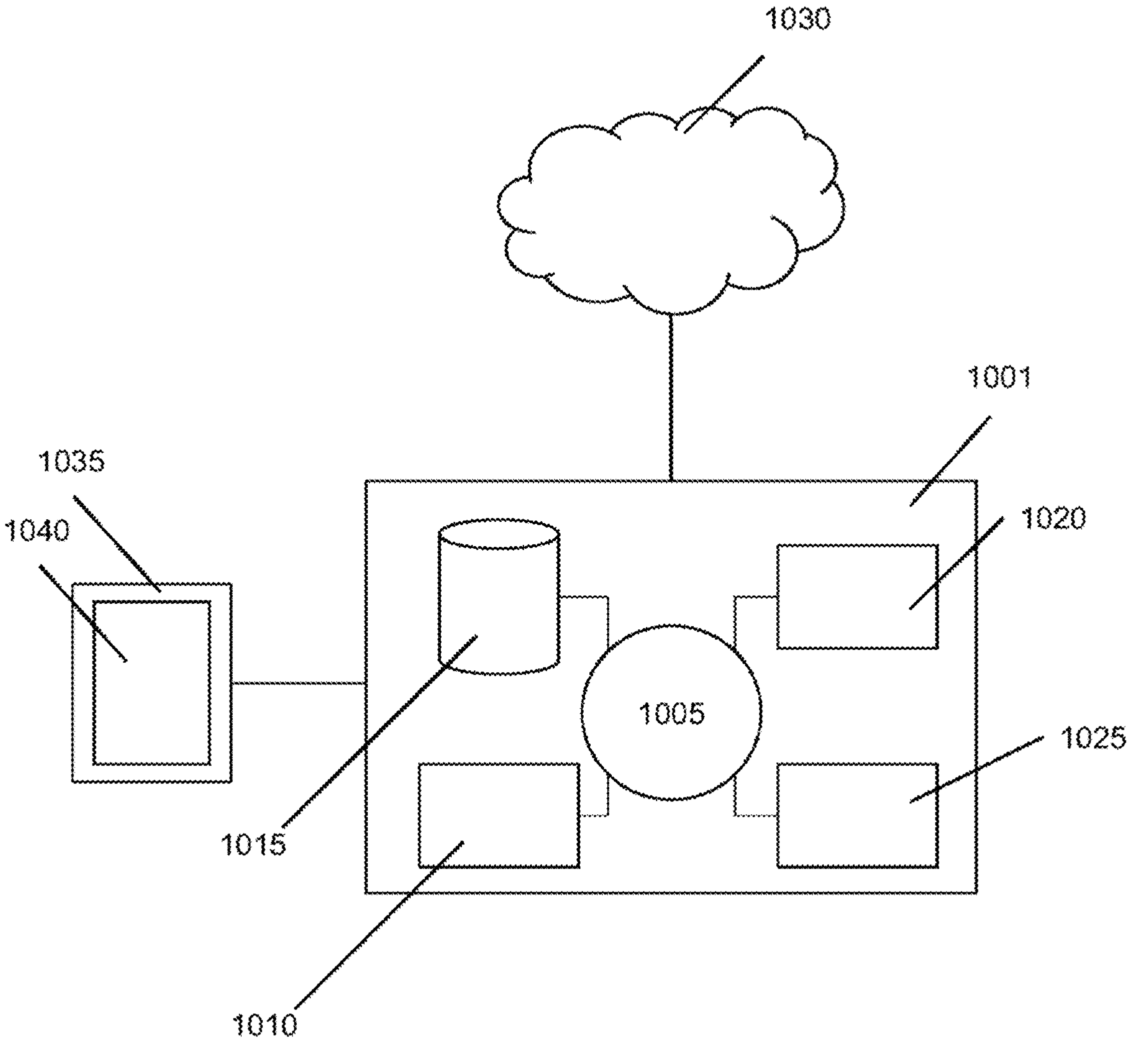
FIG. 10 shows an exemplary computer system, in accordance with embodiments of the invention.

The present disclosure provides computer systems that are programmed to implement methods of the disclosure. FIG. 10 shows a computer system 1001 that is programmed or otherwise configured to implement the web-based digital auditory map. The computer system can be an electronic device of a user or a computer system that is remotely located with respect to the electronic device. The electronic device can be a mobile electronic device.

The computer system 1001 may include a central processing unit (CPU, also "processor" and "computer processor" herein) 1005, which can be a single core or multi core processor, or a plurality of processors for parallel processing. The computer system also includes memory or memory location 1010 (e.g., random-access memory, read-only memory, flash memory), electronic storage unit 1015 (e.g., hard disk), communication interface 1020 (e.g., network adapter) for communicating with one or more other systems, and peripheral devices 1025, such as cache, other memory, data storage and/or electronic display adapters. The memory 1010, storage unit 1015, interface 1020 and peripheral devices 1025 are in communication with the CPU 1005 through a communication bus (solid lines), such as a motherboard. The storage unit 1015 can be a data storage unit (or data repository) for storing data. The computer system 1001 can be operatively coupled to a computer network ("network") 1030 with the aid of the communication interface 1020. The network 1030 can be the Internet, an internet and/or extranet, or an intranet and/or extranet that is in communication with the Internet.

The network 1030 in some cases is a telecommunication and/or data network. The network can include one or more computer servers, which can enable distributed computing, such as cloud computing. Such cloud computing may be provided by cloud computing platforms such as, for example, Amazon Web Services (AWS), Microsoft Azure, Google Cloud Platform, and IBM cloud. The network, in some cases with the aid of the computer system 1001, can implement a peer-to-peer network, which may enable devices coupled to the computer system to behave as a client or a server.

The CPU 1005 can execute a sequence of machine-readable instructions, which can be embodied in a program or software. The instructions may be stored in a memory location, such as the memory 1010. The instructions can be directed to the CPU, which can subsequently program or otherwise configure the CPU to implement methods of the present disclosure. Examples of operations performed by the CPU can include fetch, decode, execute, and writeback.

The CPU 1005 can be part of a circuit, such as an integrated circuit. One or more other components of the system can be included in the circuit. In some cases, the circuit is an application specific integrated circuit (ASIC).

The storage unit 1015 can store files, such as drivers, libraries and saved programs. The storage unit can store user data, e.g., user preferences and user programs. The computer system 1001 in some cases can include one or more additional data storage units that are external to the computer system, such as located on a remote server that is in communication with the computer system through an intranet or the Internet.

The computer system 1001 can communicate with one or more remote computer systems through the network 1030. For instance, the computer system can communicate with a remote computer system of a user (e.g., a user of an experimental environment). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system via the network.

Methods as described herein can be implemented by way of machine (e.g., computer processor) executable code stored on an electronic storage location of the computer system 1001, such as, for example, on the memory 1010 or electronic storage unit 1015. The machine executable or machine readable code can be provided in the form of software. During use, the code can be executed by the processor 1005. In some cases, the code can be retrieved from the storage unit and stored on the memory for ready access by the processor. In some situations, the electronic storage unit can be precluded, and machine-executable instructions are stored on memory.

The code can be configured to receive data representative of spatial measurements of features within a real-world or data-based environment from storage 1015 or from external data sources obtained through the network 1030 via the communication interface 1020. The code executed by the processor 1005 can comprise a digital audio map component which generates a digital audio map through a digital audio map generator component. The digital audio map component can present a digital audio map to a user through a digital audio map presentation component. The digital map component may be written in a high level computer language such as C/C++, C#, Visual Basic, Java, Ruby, Python, Go, Rust, and Javascript, including Javascript frameworks such as React and VueJS.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1001 can include or be in communication with an electronic display 1035 that comprises a user interface (UI) 1040 for providing, for example, selection of an environment, a component of an environment, or a time point of an environment. Examples of UI's include, without limitation, a graphical user interface (GUI), Auditory User Interface (AUI), and web-based user interface.

Methods and systems of the present disclosure can be implemented by way of one or more algorithms. An algorithm can be implemented by way of software upon execution by the central processing unit 1005. The algorithm can, for example, capture a configuration of one or more experimental environments; store in a registry the experimental environments at each of one or more time points; perform one or more experimental executions which leverage experimental environments; provide outputs of experimental executions which leverage the environments; generate a plurality of linkages between the experimental environments and the experimental executions; and generate one or more execution states corresponding to the experimental environments at one or more time points.

The digital auditory map is a software application running on a computer. It could be distributed over a network and downloaded on the user's machine, downloaded as a package to be programmatically interfaced by other applications, accessed through a URL as either an API or embedded application, compiled into other applications, downloaded as a stand-alone application, or executed by a computing device that can run the code.

The computer system may be in communication with one or more databases. The one or more databases may utilize any suitable database techniques. For instance, structured query language (SQL) or "NoSQL" database may be utilized for storing the map data, auditory data, user information and the like. Some of the databases may be implemented using various standard data-structures, such as an array, hash, (linked) list, struct, structured text file (e.g., XML), table, JSON, NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present invention is implemented as a data-structure, the use of the database of the present invention may be integrated into another component such as the component of the present invention. Also, the database may be implemented as a mix of data structures, objects, and relational structures.

Databases may be consolidated and/or distributed in variations through standard data processing techniques. Portions of databases, e.g., tables, may be exported and/or imported and thus decentralized and/or integrated.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for providing a digital map, said method comprising:

accepting pre-existing data representative of spatial measurements of features within a real-world or data-based environment; and generating a digital map comprising objects from the data representative of one or more features, wherein the digital map comprises a plurality of navigational modes comprising:

a tree-based mode comprising an object menu accessible in a hierarchical manner, the object menu comprising objects within the environment, wherein the objects comprise one or more of points, polygons, or lines; and a grid-based mode comprising a text message automatically generated whenever a user moves to a new location within the environment; and accepting input from the user to switch between navigation modes;

presenting to the user the object menu when tree-based mode is utilized; and automatically presenting to the user text messages comprising indications of empty space and attributes of the objects when grid-based mode is utilized.

2. The method of claim 1, further comprising a navigational mode comprising a first-person-based mode configured to enable navigation at a selected direction at a specified rate, comprising one or more text messages indicating changes to the navigation or proximity to surrounding objects, and presenting to the user one or more text messages indicating changes to the navigation or proximity to surrounding objects when first-person mode is utilized.

3. The method of claim 2, wherein when a user switches between grid-based mode and first-person-based mode, the speed, zoom level and/or orientation are preserved.

4. The method of claim 1, wherein the data representative of spatial measurements of features within a real-world is accepted from an external vector data source.

5. The method of claim 1, further comprising accepting data associated with features within the real-world or data-based environment.

6. The method of claim 5, wherein the data associated with features comprise numeric or statistical data.

7. The method of claim 6, further comprising presenting to the user text messages comprising data associated with features when grid-based mode is utilized.

8. The method of claim 1, wherein the data representative of spatial measurements of features within a real-world is accepted from a plurality of data sources, which may be internal or external, and generating the digital map further comprises resolving boundaries between any different geometries or relationships provided by the plurality of data sources, and further comprising dynamically adjusting the scale of the digital map whereby the objects may be filtered based on the level of granularity, and the text message may be proportionately adjusted by conversion to a different coordinate system.

9. The method of claim 1, wherein generating the digital map further comprises assigning specific properties to the features, wherein the specific properties assigned to the features include text messages representing contexts such as coordinates, location, name of the feature, and/or sounds associated with the feature, which may be accessed by a user virtually navigating to the feature.

10. The method of claim 9, wherein each of the contexts of the text messages are associated with one or more of the plurality of navigational modes whereby the text messages accessed by the user navigating to the feature is the context associated with the navigation mode being used by the user.

11. A computer system for providing a digital map, the system comprising:

at least one processing unit;

memory operably associated with at least one processing unit;

a digital map component storable in memory and executable by at least one processing unit, the digital map program comprising:

a digital map generator component configured to receive pre-existing data representative of spatial measurements of features within a real-world or data-based environment and generate a digital map comprising objects from the data representative of one or more features;

a digital map presentation component configured to provide a plurality of navigational modes comprising:

a tree-based mode comprising an object menu accessible in a hierarchical manner, the object menu comprising objects within the environment, wherein the objects comprise one or more of points, polygons, or lines; and a grid-based mode comprising a text message automatically generated whenever a user moves to a new location within the environment; and wherein the digital map component is further configured to accept input from the user to switch between navigational modes;

wherein the object menu is presented to the user when tree-based mode is utilized;

wherein text messages comprising indications of empty space and attributes of the objects are automatically presented to the user when grid-based mode is utilized.

12. The system of claim 11, further comprising a first-person-based mode configured to enable navigation at a selected direction at a specified rate, comprising one or more text messages indicating changes to the navigation or proximity to surrounding objects, wherein the text messages indicating the navigation or surrounding objects are presented to the user when first-person mode is utilized.

13. The system of claim 12, wherein when a user switches between grid-based mode and first-person-based mode, the speed, zoom level and/or orientation are preserved.

14. The system of claim 11, wherein the digital map component is further configured to accept the data representative of spatial measurements of features from an external vector data source.

15. The system of claim 11, wherein the digital map component is further configured to receive data associated with features within the real-world or data-based environment.

16. The method of claim 15, wherein the data associated with features comprise numeric or statistical data.

17. The method of claim 16, wherein the digital map component is further configured to present to the user text messages comprising data associated with features when grid-based mode is utilized.

18. The system of claim 11, wherein the digital map component is further configured to accept the data representative of spatial measurements of features from a plurality of data sources, which may be internal or external, and generation of the digital map further comprises resolving boundaries between any different geometries or relationships provided by the plurality of data sources, and further comprising dynamically adjusting the scale of the digital audio map whereby the objects may filtered based on the level of granularity, and the text messages are proportionately adjusted by conversion to a different coordinate system.

19. The system of claim 11, wherein the digital map component is further configured to generate the digital map further comprising assigning specific properties to the features, wherein the specific properties assigned to the features include text messages representing contexts such as coordinates, location, name of the feature, and/or sounds associated with the feature, which may be accessed by a user navigating to the feature.

20. The system of claim 11, wherein the digital map component is further configured such that each of the contexts of the text messages are associated with one or more of the plurality of navigational modes whereby the text message accessed by the user navigating to the feature is the context associated with the navigation mode being used by the user.

* * * * *